United States Patent
Halaharivi et al.

(10) Patent No.: US 9,870,157 B2
(45) Date of Patent: Jan. 16, 2018

(54) COMMAND BALANCING AND INTERLEAVING FOR WRITE AND READS BETWEEN FRONT END AND BACK END OF SOLID STATE DRIVE

(71) Applicant: Toshiba Memory Corporation, Tokyo (JP)

(72) Inventors: Raja V. S. Halaharivi, San Jose, CA (US); Tony Chheang, San Jose, CA (US); Dishi Lai, San Jose, CA (US); Fred Au, Fremont, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 14/675,526

(22) Filed: Mar. 31, 2015

(65) Prior Publication Data
US 2016/0291884 A1  Oct. 6, 2016

(51) Int. Cl.
*G06F 12/00* (2006.01)
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | |
|---|---|---|---|
| 7,461,218 B2 * | 12/2008 | Muthrasanallur ... | G06F 13/1668 711/100 |
| 8,543,756 B2 | 9/2013 | Nguyen et al. | |
| 2003/0236953 A1 * | 12/2003 | Grieff ................... | G06F 3/0607 711/151 |
| 2010/0199033 A1 | 8/2010 | Nguyen et al. | |
| 2011/0167197 A1 | 7/2011 | Leinwander | |
| 2012/0317348 A1 | 12/2012 | Tzeng | |
| 2014/0281050 A1 * | 9/2014 | Vogan ................... | G06F 3/0634 710/14 |

* cited by examiner

Primary Examiner — David X Yi
Assistant Examiner — Alan Otto
(74) Attorney, Agent, or Firm — Patterson & Sheridan, LLP (57) ABSTRACT

A data storage device includes a non-volatile semiconductor storage device and a controller that is configured to perform interleaving of small reads with large reads and small writes with large writes. In the example of reads, the controller receives a sequence of read commands including a first read command having a read size larger than a read threshold size and a second read command having a read size smaller than the read threshold size, and issue first and second read requests in succession to read data of a predetermined size less than the read threshold size, from the non-volatile semiconductor storage device. The interleaving is achieved by issuing the first read request to execute the first read command and the second read request to execute the second read command. As a result of this interleaving, the second read command will have a chance to complete earlier than the first read command even though it was received by the controller later in time.

14 Claims, 4 Drawing Sheets

COMMAND BALANCING AND INTERLEAVING FOR WRITE AND READS BETWEEN FRONT END AND BACK END OF SOLID STATE DRIVE

BACKGROUND

Solid-state drives (SSDs) generally have faster performance, are more compact, and are less sensitive to vibration or physical shock than conventional magnetic disk drives. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

The performance of SSDs is not attributable only to the speed of reading from and writing to memory cells of SSDs but also the time taken by the SSD controller to process the read and write commands issued by connected host systems. From the perspective of the host system, IO (input-output operation) latency is measured by the time it issues the read or write command to the SSD to the time the SSD responds with read data or a write acknowledgement. If there any delays between those two time periods, including delays attributable to the SSD controller, the host system will experience an increase in latency.

Efforts have been made to decrease IO latencies attributable to the SSD controller design. For example, instead of employing a single port for receiving host commands, many SSD host interface circuits may employ two or more of such ports. Higher speeds may also be achieved with larger size dynamic random access memory (DRAM) that is used in caching reads and writes. However, making the DRAM larger has the drawback of increasing the overall cost of the SSD.

SUMMARY

One or more embodiments provide an SSD controller that improves performances of read and write commands for small size data (referred to herein as "small reads" and "small writes," respectively) that are issued after read and write commands for larger size data (referred to herein as "large reads" and "large writes," respectively) and have to wait until the earlier commands are completed. In the embodiments, an interleaving technique is employed to allow the small reads and writes to complete while the large reads and writes are being processed.

A data storage device, according to an embodiment, includes a non-volatile semiconductor storage device and a controller that is configured to perform interleaving of small reads with large reads and small writes with large writes. In the example of reads, the controller receives a sequence of read commands including a first read command having a read size larger than a read threshold size and a second read command having a read size smaller than the read threshold size, and issue first and second read requests in succession to read data of a predetermined size less than the read threshold size, from the non-volatile semiconductor storage device. The interleaving is achieved by issuing the first read request to execute the first read command and the second read request to execute the second read command. As a result of this interleaving, the second read command will have a chance to complete earlier than the first read command even though it was received by the controller later in time.

DETAILED DESCRIPTION

Figure 1:
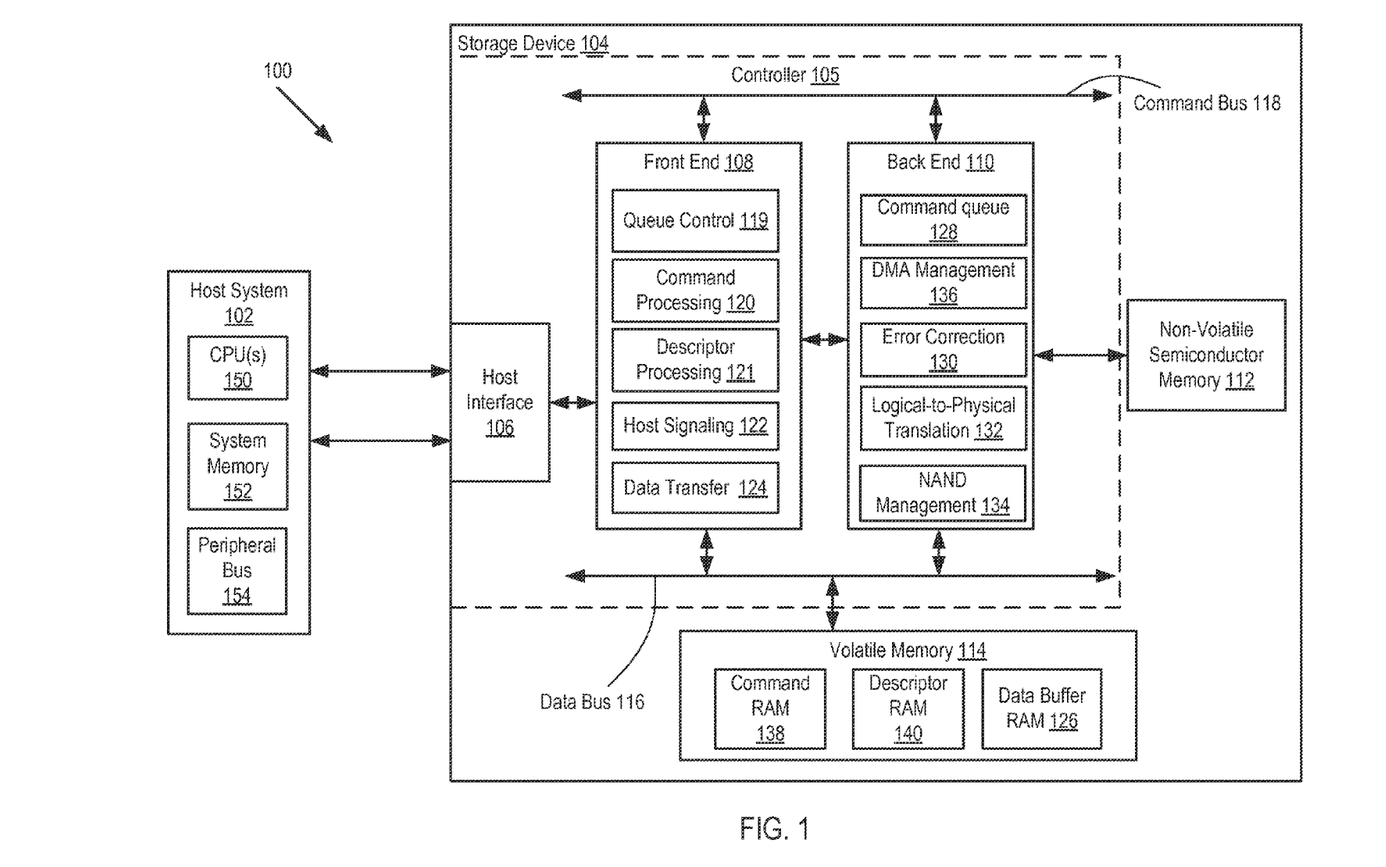
FIG. 1 is a block diagram of a solid-state drive (SSD) configured with a controller according to one or more embodiments.

FIG. 1 is a block diagram showing an example of a computing system 100 including a storage device 104 in communication with a host system 102. Host system 102 is a computing system that comprises one or more central processor units (CPUs) 150, a system memory 152, a peripheral bus 154, and other components as is generally known. CPUs 150 can include any type of microprocessor(s) known in the art. System memory 152 may include, for example, random access memory (RAM), read only memory (ROM), or a combination thereof Peripheral bus 154 can be any type of computer bus interface, such as a peripheral component interconnect express (PCIe) bus, serial advanced technology attachment (SATA) bus, or the like. Storage device 104 provides non-volatile storage functionality for use by host system 102. Storage device 104 can be a solid-state drive ("SSD"), which is a non-volatile storage device that includes non-volatile semiconductor-based storage elements, such as NAND-based flash memory, as the storage medium (as opposed to, for example, the magnetic medium used in hard disk drives).

Storage device 104 includes an SSD controller 105, volatile memory 114, and non-volatile semiconductor memory 112. Storage device 104 may also include other elements not shown, such as power supply circuitry (including circuitry for transferring power to the SSD controller 105, volatile memory 114, and non-volatile semiconductor memory 112, as well as capacitors for buffering the power supply), indicator light circuitry, temperature sensors, boot circuitry, clock circuitry, and other circuitry for assisting with various functions.

SSD controller 105 receives and processes commands from host system 102 in order to perform operations on the non-volatile semiconductor memory 112. Commands from host system 102 include requests to read or write to locations within the non-volatile semiconductor memory 112, and various administrative commands, such as commands for querying the feature set of storage device 104, commands for formatting non-volatile memory 112, commands for creating and modifying various types of queues, commands for requesting notification of various events, and various other commands. SSD controller 105 includes a host interface 106, a front end 108, a back end 110, a command bus 118, and a data bus 116.

Host interface 106 comprises circuitry for communicating with host system 102. In one embodiment, host interface 106 is coupled to peripheral bus 154 in host system 102 through one or more ports (e.g., two ports are shown). For example, host interface 106 can be a PCIe interface that communicates according to the PCIe standard, and SSD controller 105 can comply with the non-volatile memory host controller interface specification (NVMHCI) referred to as "NVM express" or "NVMe." In other embodiments, the interface is a SATA interface or a SAS interface.

Front end 108 communicates with host system 102 to receive, organize, and forward commands from host system 102 to back end 110. Front end 108 also forwards status data from back end 110 to host system 102. Back end 110 performs tasks associated with commands received from front end 108, accessing non-volatile semiconductor memory 112 as needed in accordance with these tasks. Back end 110 employs direct memory access (DMA) to store and retrieve data from system memory 152 of host system 102. For example, back end 110 can transfer data that has been read from non-volatile semiconductor memory 112 to system memory 152 using DMA. Back end 110 can transfer data to be written to non-volatile semiconductor memory 112 from system memory 152 using DMA.

Both front end 108 and back end 110 are coupled to a command bus 118 and a data bus 116. Command bus 118 functions to transfer command-related data between various sub-units of front end 108 and back end 110, and data bus 116 serves to transfer data between volatile memory 114 and various sub-units of front end 108 and back end 110. Volatile memory 114 can include one or more types of RAM, such as static RAM (SRAM), dynamic RAM (DRAM), or the like.

Volatile memory 114 can include RAM modules or specific regions of RAM dedicated to storing particular types of data. In an embodiment, volatile memory 114 includes command RAM 138 configured to store commands received from host system 102, descriptor RAM 140 configured to store DMA descriptors received from host system 102. Data buffer RAM 126 configures a read cache and a write cache. A read cache temporarily stores data read from non-volatile semiconductor memory 112 ("read data") in response to a command from host system 102. A write cache temporarily stores data to be written to non-volatile semiconductor memory 112 ("write data") in response to a command from host system 102.

While command RAM 138, descriptor RAM 140, and data buffer RAM 126 are shown as being part of a single group of volatile memory coupled to data bus 116, other configurations are possible. For example, command RAM 138 and descriptor RAM 140 can be part of a group of volatile memory only coupled to front end 108, and data buffer RAM 126 can be part of a group of volatile memory only coupled to back end 110. In such an example, front end 108 can forward command and descriptor data to back end 110 over a bus (e.g., command bus 118 or data bus 116) or by a direct link to back end 110, rather than back end 110 having direct access to command and descriptor data in volatile memory 114.

Non-volatile semiconductor memory 112 stores data in a non-volatile manner at the request of host system 102. Non-volatile semiconductor memory 112 includes one or more arrays of non-volatile semiconductor-based storage elements, some examples of which include non-volatile NAND flash memory, non-volatile NOR flash memory, non-volatile DRAM based memory, magnetoresistive random-access memory (MRAM), and other types of memory. As NAND-based flash memory is commonly used as the non-volatile semiconductor memory 112, non-volatile semiconductor memory 112 may be referred to herein as NAND memory 112 or simply as NAND 112.

Front end 108 includes multiple functional units, including queuing control unit 119, command processing unit 120, descriptor processing unit 121, host signaling unit 122, and data transfer unit 124. Command processing unit 120 fetches commands issued by host system 102. Command processing unit 120 provides the commands to queuing control unit 119. Queuing control unit 119 stores the commands in command RAM 138. Queuing control unit 119 implements command load balancing to select eligible commands to be performed by back end 110. Command processing unit 120 forwards commands selected by queuing control unit 119 to back end 110 for processing. Command processing unit 120 can also perform various operations on commands, such as command checks. Command processing unit 120 also receives status information for the commands from back end 110. Descriptor processing unit 121 fetches DMA descriptors from host system 102 associated with the commands. For example, the DMA descriptors point to write and read buffers in system memory 152 for write and read commands. Descriptor processing unit 121 stores received descriptors for the commands in descriptor RAM 140.

Host signaling unit 122 can transmit command status information obtained from command processing unit 120 to host system 102. Host signaling unit 122 generates host notification signals and transmits these signals to host system 102. These signals may be used to indicate that one or more commands submitted by host system 102 are complete. Host notification signals include interrupts and may be out-of-band, pin-based interrupts, or may be in-band message signaled interrupts ("MSI" or "MSIx"). The interrupts include data identifying the command that has been completed as well as status data associated with that command. Host signaling unit 122 includes an interrupt table that includes such information, as well as an interrupt generator which generates interrupts for transmission to host system 102, based on the information stored in the interrupt table.

Host system 102 can maintain various command queues in system memory 152 (not shown), such as submission queues and completion queues. Submission queues store commands sent to SSD controller 105, and completion queues store information about commands completed by SSD controller 105. Host system 102 also maintains write data buffers and read data buffers (not shown) in system memory 152. Host system 102 also maintains DMA descriptors (not shown) associated with the write and read data buffers in system memory 152.

Data transfer unit 124 serves as an intermediary between host interface 106 and the sub-units of front end 108 (e.g., queue control unit 119, command processing unit 120, and descriptor processing unit 121). Data transfer unit 124 directs data received from host interface 106 to the appropriate sub-unit (e.g., command data to command processing unit 120 and descriptor data to descriptor processing unit 121).

Back end 110 includes multiple functional units, including a command queue 128, an error correction unit 130, a logical-to-physical address translation unit 132, a NAND management unit 134, and DMA management unit 136. Command queue 128 stores commands received from front end 108 for further processing. Buffering commands in this manner allows back end 110 to process received commands based on a particular schedule or on specific timing or state-based constraints. Error correction unit 130 provides error correction functionality for data stored in non-volatile semiconductor memory 112. Error correction unit 130 generates error-correction data for data written to the non-volatile semiconductor memory 112 and stores the error-correction data with the written data. When the written data is read out and error in reading is encountered, error correction unit 130 performs error correction operations using the error-correction data.

Logical-to-physical translation unit 132 translates logical addresses, e.g., logical block addresses (LBAs), to physical addresses, e.g., physical block addresses, of non-volatile semiconductor memory 112 during reading or writing data. Logical-to-physical translation unit 132 accesses a map, known as a flash translation layer (FTL), when converting logical addresses to physical addresses so that data requested by host system 102 with a logical address can be properly physically addressed within non-volatile semiconductor memory 112.

NAND management unit 134 is configured to write data to non-volatile semiconductor memory 112 and read data from non-volatile semiconductor memory 112. NAND management unit 134 stores data read from non-volatile semiconductor memory 112 in a read cache in data buffer RAM 126. NAND management unit 134 receives data to be written to non-volatile semiconductor memory 112 from a write cache in data buffer RAM 126. NAND management unit 134 may also provide other functions, such as wear leveling, bad block mapping, garbage collection, and read scrubbing.

Wear leveling is a technique to compensate for the fact that a (relatively) limited number of write operations can be performed on each NAND data storage element, commonly referred to as a block. Wear leveling comprises periodically moving data between NAND data storage blocks in order to even out or "level" the number of times write operations are performed for each data storage block. Bad block mapping is a technique for marking blocks as being "bad" after it is discovered that such blocks are unreliable. Blocks marked as bad are not written to or read from.

Garbage collection is a technique whereby valid pages (a subunit of a block) within a block are copied to a new block so that the source block can be erased. Garbage collection is needed in NAND memory because the unit of writing is a page and the unit of erasure is a block. Accordingly, if a command to write data targets an existing page, then the data of the existing page is not actually modified. Instead, a new page is written and the old page is marked as invalid. As a result, the number of invalid pages continues to grow and garbage collection becomes necessary to free up blocks having a large number of invalid pages.

Read scrubbing is a technique whereby SSD controller 105 periodically reads data in the non-volatile semiconductor memory 112, performs error checking operations on the data to determine if there are errors, corrects errors that are found, and then writes the error-corrected data back to the same location. This technique helps to reduce the amount of errors experienced when reading data out from the non-volatile semiconductor memory 112.

DMA management unit 136 is configured to control DMA transfer of data between SSD controller 105 and system memory 152 in host system 102. DMA management unit 136 uses DMA descriptors obtained by front end 108, which point to read and write buffers in system memory 152. DMA management unit 136 transfers data from a read cache in data buffer RAM 126 to system memory 152 using corresponding DMA descriptors associated with a corresponding read command. DMA management unit 136 transfers data to write cache in data buffer RAM 126 from system memory 152 using corresponding DMA descriptors associated with a corresponding write command.

In various embodiments, the functional blocks included in front end 108 and back end 110 represent hardware or combined software and hardware elements for performing associated functionality. Thus, any or all of the functional blocks may be embodied as firmware executing in a processing unit, as hardware units that are hard-wired to perform the associated functionality, or as a combination thereof. For example, either or both of front end 108 or back end 110 may include one or more processors, one or more state machines, one or more application specific integrated circuits (ASICs), one or more programmable integrated circuits, or the like, that are programmed or configured to perform functions related to the functional blocks. Alternatively, a single processor may be shared between and thus may perform the functions of both front end 108 and back end 110.

Certain functional blocks and functionality associated therewith that are depicted as being included within front end 108 or back end 110 may be implemented as data structures stored within volatile memory 114. Thus, for example, queues indicated as being included in front end 108 and back end 110, may be stored within volatile memory 114. While specific functional units are shown in front end 108 and back end 110, other configurations of functional units can be used to implement the functionality described herein. In general, front end 108 and back end 110 can include one or more functional units that perform the functionality described herein.

In various examples described herein, front end 108 and functions thereof are described as being part of SSD controller 105 in storage device 104. In another embodiment, front end 108 can be separate from SSD controller 105 and/or separate from storage device 104. For example, front end 108 can be part of a controller external to storage device 104. In another embodiment, front end 108 can be implemented by host system 102. For example, the functions performed by front end 108 described above can be implemented in software executed by CPUs 150 in host system 102. Command RAM 138 and descriptor RAM 140 can be part of system memory 152. In such an embodiment, front end 108 is omitted from SSD controller 105 in storage device 104. In still another embodiment, functions of front end 108 can be divided between host system 102 and controller 105 in storage device 104.

Figure 2:
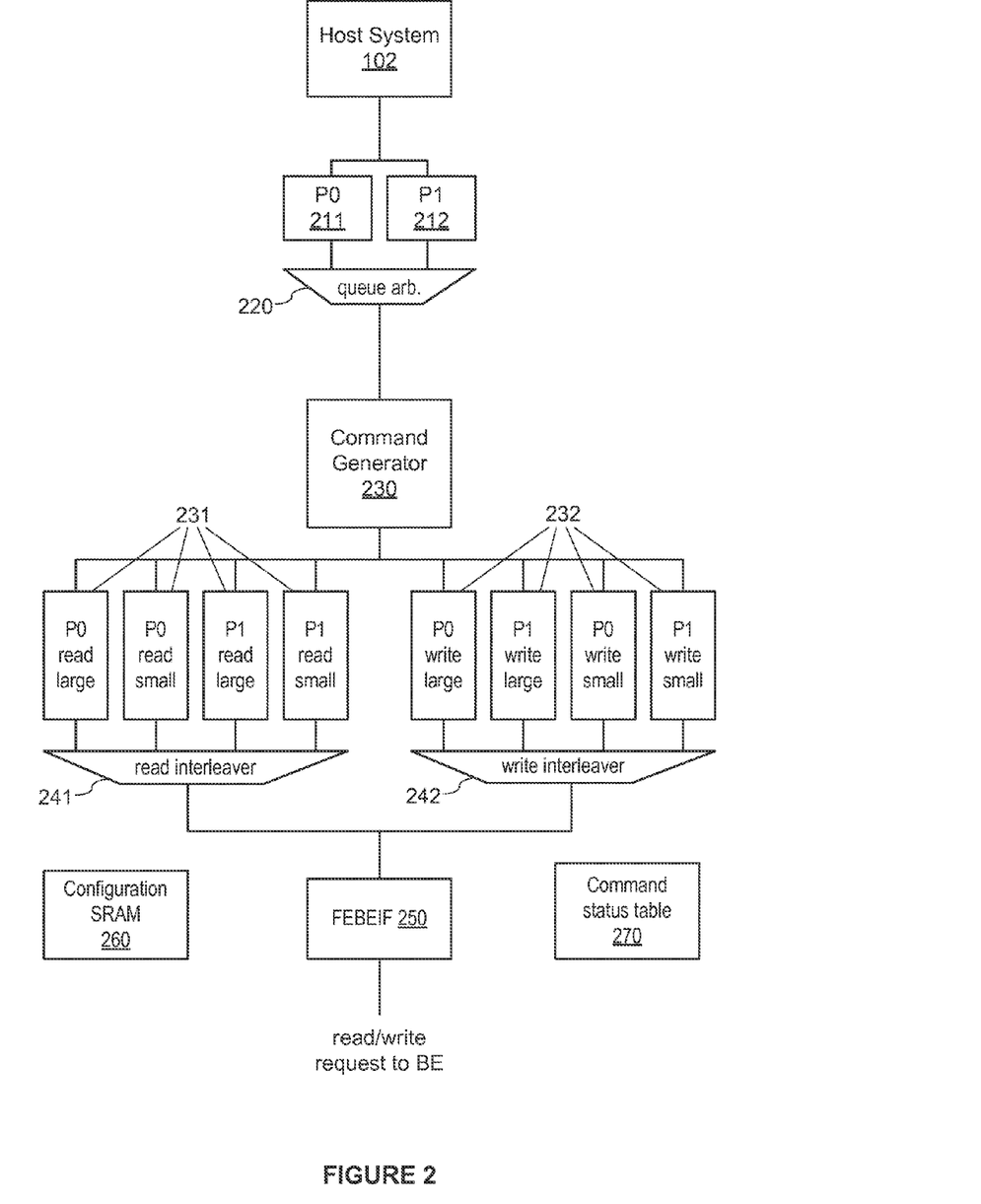
FIG. 2 is a diagram that illustrates components of the controller of FIG. 1 that are employed in the embodiments.

FIG. 2 is a diagram that illustrates components of the controller of FIG. 1 that are employed in the embodiments. Two ports, P0 211 and P1 212, are configured to receive read and write commands from host. The received commands are placed into one or more queues (not shown) that are configured for each of the ports and a queue arbitrator 220 selectively outputs commands in the queues to a command generator 230 upon receiving a ready signal from command generator 230. Each command output to command generator 230 includes the following information: (1) command type—read or write; (2) namespace identifier; (3) logical block address; (4) size of read or write; (5) receiving port; and (6) data transfer method.

Command generator 230 receives commands from queue arbitrator 220 and tags the commands with an identifier (ID) and this command ID used by SSD controller 105 to uniquely identify the command until the command is fully executed and read data or write acknowledgement is returned to host system 102 through host interface 106. Command generator 230 also examines command type, the receiving port, and data size associated with the command, and pushes the command into an appropriate one of read queues 231 or one of write queues 232. The method of selecting the appropriate queue is described below in further detail in conjunction with FIG. 4.

Read queues 231 include two read queues for read commands received through port P0, the first one for large reads and the second one for small reads, and two read queues for read commands received through port P1, the first one for large reads and the second one for small reads. Command generator 230 distinguishes between large and small reads based on a threshold read size that is programmable and stored in configuration SRAM 260. In one embodiment, the threshold read size is 64 KB.

Write queues 232 include two write queues for write commands received through port P0, the first one for large writes and the second one for small writes, and two write queues for write commands received through port P1, the first one for large writes and the second one for small writes. Command generator 230 distinguishes between large and small writes based on a threshold write size that is programmable and stored in configuration SRAM 260, which may be the same or different from the threshold read size. In one embodiment, the threshold write size is 128 KB.

Read interleaver 241 selects read queues 231 one at a time according to an arbitration algorithm, e.g., a round robin algorithm, which may or may not be weighted, and processes the next command in the selected read queue. If the queue is empty, read interleaver 241 selects the next read queue according to the arbitration algorithm. If the selected queue is not empty, the command in the selected queue is processed by issuing a read request through FEBEIF (front end/back end interface) 250 to read data from a location in non-volatile semiconductor memory 112 corresponding to the namespace identifier and the logical block address specified in the command being processed. The data size of the read request is limited to a cluster read size (e.g., 4, 8, 16, 32 KB, or higher) as defined in configuration SRAM 260. Accordingly, if the command in the selected queue has a large size, the command will be executed only partially with a single read request, and other commands, e.g., small reads, can be interleaved therewith and executed completely prior to the large read even though the large read may have been received by command generator 230 prior to the small read. Without this feature, if the large read is received by command generator 230 prior to the small read, the small read will have to wait until the large read executes completely. However, it should be recognized that for each read queue 231, read interleaver 241 will execute to completion the read commands in the queue in the order they were added thereto, and for each write queue 232, write interleaver 242 will execute to completion the write commands in the queue in the order they were added thereto.

Write interleaver 242 operates in a manner similar to read interleaver 241. Write interleaver 242 selects write queues 232 one at a time according to an arbitration algorithm, e.g., a round robin algorithm, which may or may not be weighted, and processes the next command in the selected write queue. If the queue is empty, write interleaver 242 selects the next write queue according to the arbitration algorithm. If the selected queue is not empty, the command in the selected queue is processed by issuing a write request through FEBEIF 250 to write data into a location in non-volatile semiconductor memory 112 corresponding to the namespace identifier and the logical block address specified in the command being processed. The data size of the write request is limited to an atomic write size (e.g., 4, 8, 16, 32, 64, 128 KB, or higher) as defined in configuration SRAM 260. Accordingly, if the command in the selected queue has a large size, the command will be executed only partially with a single write request, and other commands, e.g., small writes, can be interleaved therewith and executed completely prior to the large write even though the large write may have been received by command generator 230 prior to the small write. Without this feature, if the large write is received by command generator 230 prior to the small write, the small write will have to wait until the large write executes completely.

Command status table 270 stores tracking data for each of read and write commands. For reads, the tracking data includes the read size, cumulative size of read data associated with read requests issued through FEBEIF 250, cumulative size of read data associated with read responses returned through FEBEIF 250, and cumulative size of read data transferred to host system 102. For writes, the tracking data includes the write size, cumulative size of write data associated with write requests issued through FEBEIF 250, cumulative size of write data associated with write responses returned through FEBEIF 250, and cumulative size of write data associated with write acknowledgements transferred to host system 102.

As read and write requests are issued through FEBEIF 250 and read and write responses returned through FEBEIF 250, queue control unit 119 updates command status table 270 accordingly. In addition, when read data and write acknowledgement are transferred to host system 102, queue control unit 119 updates command status table 270 accordingly. Queue control unit 119 also removes a read command from its corresponding queue 231 when the tracking data for the read command in command status table 270 indicate that cumulative size of read data associated with the read requests issued through FEBEIF 250 matches the read size of the read command. Similarly, command processing unit 120 removes a write command from its corresponding queue 232 when the tracking data for the write command in command status table 270 indicate that cumulative size of write data associated with the write requests issued through FEBEIF 250 matches the write size of the write command.

Figure 3:
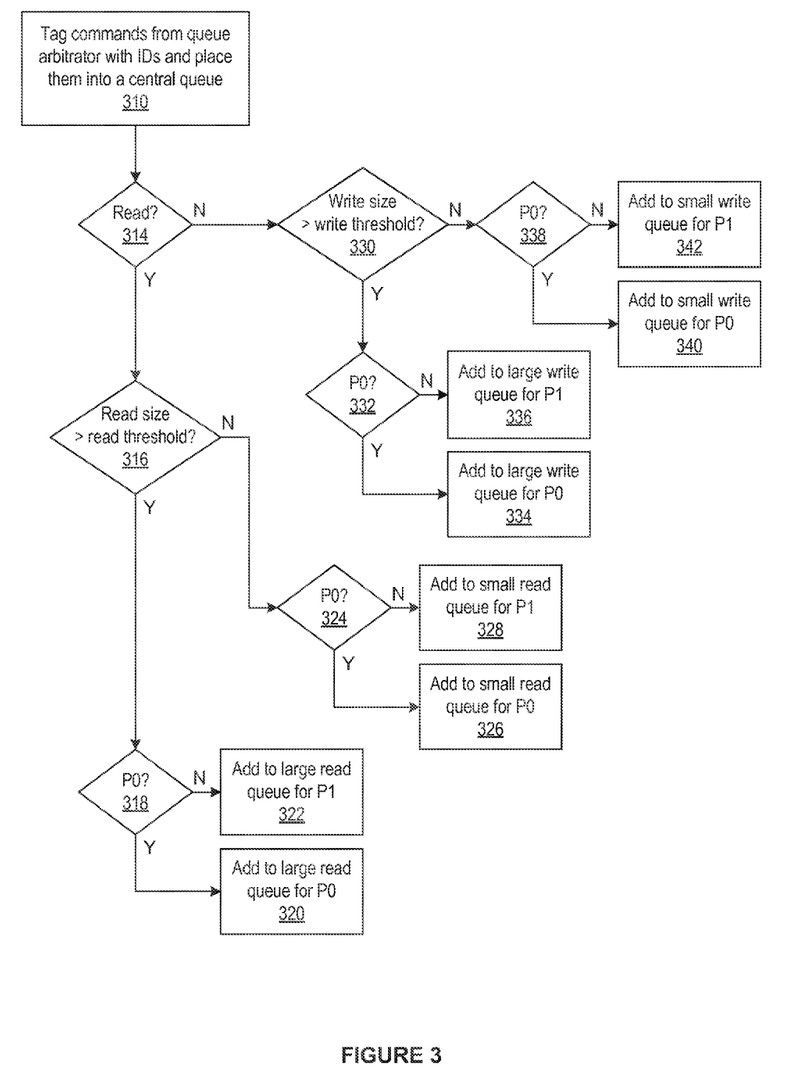
FIG. 3 is a flow diagram of method steps carried out by a command generator of the command processing unit.

FIG. 3 is a flow diagram of method steps carried out by command generator 230 of command processing unit 120. At step 310, command generator 230 tags commands from queue arbitrator 220, and places them into a central queue. Command generator 230 then processes the commands in the order they were added to the central queue. For each command processed, command generator 230 examines the command type at step 314 and determines whether or it is a read or a write. If the command is a read, the read size of the command is compared at step 316 against a read threshold size stored in SRAM 260. If the read size is greater than the read threshold size, the receiving port of the command is examined at step 318. If the command is received through port P0 as determined at step 318, the command is added to a large read queue for port P0 at step 320. If the command is not received through port P0 as determined at step 318, the command is added to a large read queue for port P1 at step 322.

Returning to step 316, if the read size is not greater than the read threshold size, the receiving port of the command is examined at step 324. If the command is received through port P0 as determined at step 324, the command is added to a small read queue for port P0 at step 326. If the command is not received through port P0 as determined at step 324, the command is added to a small read queue for port P1 at step 328.

Returning to step 314, if the command is not a read, the write size of the command is compared at step 330 against a write threshold size stored in SRAM 260. If the write size is greater than the write threshold size, the receiving port of the command is examined at step 332. If the command is received through port P0 as determined at step 332, the command is added to a large write queue for port P0 at step 334. If the command is not received through port P0 as determined at step 332, the command is added to a large write queue for port P1 at step 336.

Returning to step 330, if the write size is not greater than the write threshold size, the receiving port of the command is examined at step 338. If the command is received through port P0 as determined at step 338, the command is added to a small write queue for port P0 at step 340. If the command is not received through port P0 as determined at step 338, the command is added to a small write queue for port P1 at step 342.

Figure 4:
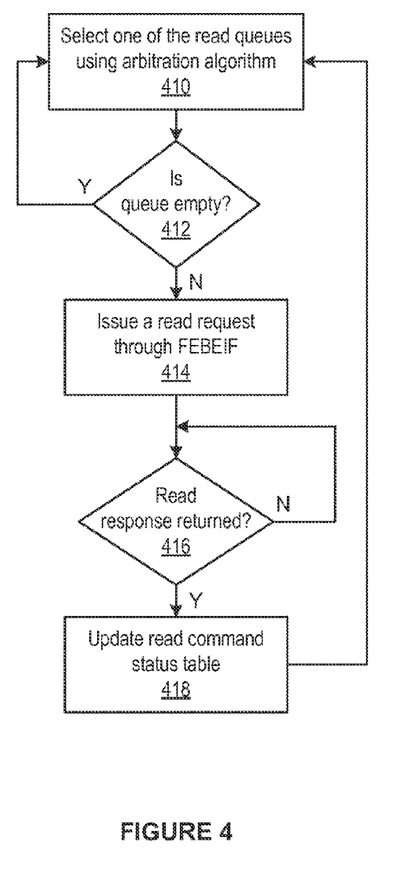
FIG. 4 is a flow diagram of method steps for issuing a read request, according to embodiments.

FIG. 4 is a flow diagram of method steps for issuing a read request by command processing unit 120, according to embodiments. At step 410, read interleaver 241 selects one of read queues 231 according to an arbitration algorithm, e.g., a round robin algorithm, which may or may not be weighted, and processes the next command in the selected read queue. If the queue is empty as determined at step 412, read interleaver 241 returns to step 410 and selects the next read queue according to the arbitration algorithm. If the selected queue is not empty, the command in the selected queue is processed at step 414 by issuing a read request through FEBEIF 250 to read data from a location in non-volatile semiconductor memory 112 corresponding to the namespace identifier and the logical block address specified in the command being processed. As described above, the read size of the read request is limited to a cluster read size as defined in configuration SRAM 260. After issuing the read request through FEBEIF 250, queue control unit 119 waits for a corresponding read response at step 416. When the corresponding read response is received at step 416, queue control unit 119 at step 418 updates the tracking data for the read command that was processed at step 414 in command status table 270. After step 418, the flow returns to step 410 where another queue is selected according to the arbitration algorithm.

Accordingly, when reads are processed according to the method steps of FIG. 4, a small read may be completed ahead of a large read even though the large read is received for processing prior to the small read. The reason is that a command from each of the large and small read queues is processed one at a time in a round robin fashion, e.g., and the read size is limited to the cluster read size. As a result, while a large read has to be processed a multiple number of times to complete, a small read may be completely processed in less number of iterations. For commands with read sizes less than the cluster read size, only one iteration would be required.

Figure 5:
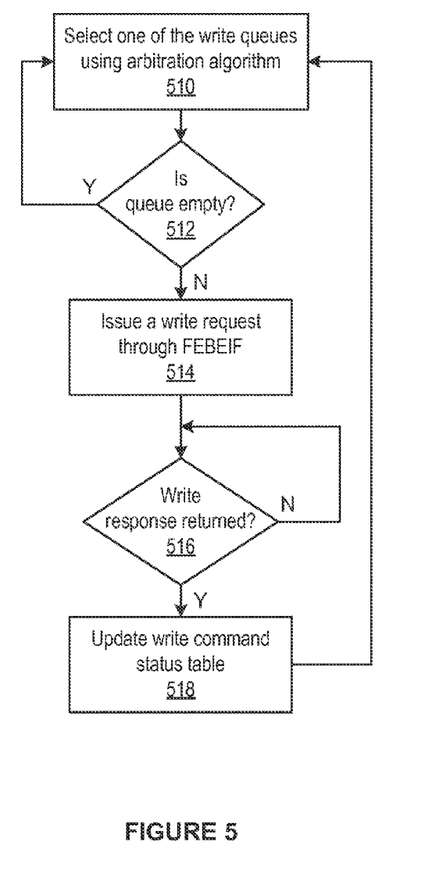
FIG. 5 is a flow diagram of method steps for issuing a write request, according to embodiments.

FIG. 5 is a flow diagram of method steps for issuing a write request by command processing unit 120, according to embodiments. At step 510, write interleaver 242 selects one of write queues 232 according to an arbitration algorithm, e.g., a round robin algorithm, which may or may not be weighted, and processes the next command in the selected write queue. If the queue is empty as determined at step 512, write interleaver 242 returns to step 510 and selects the next write queue according to the arbitration algorithm. If the selected queue is not empty, the command in the selected queue is processed at step 514 by issuing a write request through FEBEIF 250 to write data into a location in non-volatile semiconductor memory 112 corresponding to the namespace identifier and the logical block address specified in the command being processed. As described above, the write size of the write request is limited to an atomic write size as defined in configuration SRAM 260. After issuing the write request through FEBEIF 250, command processing unit 120 waits for a corresponding write response at step 516. When the corresponding write response is received at step 516, command processing unit 120 at step 518 updates the tracking data for the write command that was processed at step 514 in command status table 270. After step 518, the flow returns to step 510 where another queue is selected according to the arbitration algorithm.

Accordingly, when writes are processed according to the method steps of FIG. 5, a small write may be completed ahead of a large write even though the large write is received for processing prior to the small write. The reason is that a command from each of the large and small write queues is processed one at a time in a round robin fashion, e.g., and the write size is limited to the atomic write size. As a result, while a large write has to be processed a multiple number of times to complete, a small write may be completely processed in less number of iterations. For commands with write sizes less than the atomic write size, only one iteration would be required.

In alternative embodiments, one port may be configured in host interface 106 or more than two ports. In addition, data size of the read requests issued by queue control unit 119 is not limited to the cluster read size and may be greater than the cluster read size, and data size of the write requests issued by command processing unit 120 is not limited to the atomic write size and may be greater than the atomic write size.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

We claim:

1. A data storage device comprising:
a non-volatile semiconductor storage device; and
a controller including a first interface and a second interface configured to:
add a sequence of read commands received from a host through the first interface to first and second queues, the read commands including a first read command added to the first queue and having a read size larger than a read threshold size and a second read command added to the second queue and having a read size smaller than the read threshold size, and track completion of the first read command and the second read command by storing first tracking data for the first read command and second tracking data for the second read command, the first tracking data including a first read size, which is equal to the read size of the first read command, and a first cumulative size, and the second tracking data including a second read size, which is equal to the read size of the second read command, and a second cumulative size,
issue first and second read requests in succession through the second interface to read data of a predetermined size for reading less than the read threshold size, from the non-volatile semiconductor storage device,
upon receiving a read response in response to the issued first read request, update the first tracking data by adding the predetermined size for the reading to the first cumulative size, and remove the first read command from the first queue when the first cumulative size equals the first read size, and
upon receiving a read response in response to the issued second read request, update the second tracking data by adding the predetermined size for the reading to the second cumulative size, and remove the second read command from the second queue when the second cumulative size equals the second read size.

2. The data storage device of claim 1, wherein the first read request partially executes the first read command and one or more additional read requests are issued to fully execute the first read command.

3. The data storage device of claim 2, wherein the second read request fully executes the second read command.

4. The data storage device of claim 2, wherein the second read request partially executes the second read command and one or more additional read requests are issued to fully execute the second read command, the total number of read requests issued to fully execute the second read command being less than the total number of read requests issued to fully execute the first read command.

5. The data storage device of claim 1, wherein the controller is configured to
add a sequence of write commands received from the host through the first interface to third and fourth queues, the write commands including a first write command added to the third queue and having a write size larger than a write threshold size and a second write command added to the fourth queue and having a write size smaller than the threshold size, and track completion of the first write command and the second write command by storing third tracking data for the first write command and fourth tracking data for the second write command, the third tracking data including a first write size, which is equal to the write size of the first write command, and a third cumulative size, and the fourth tracking data including a second write size, which is equal to the write size of the second write command, and a fourth cumulative size,
issue first and second write requests in succession through the second interface to write data of a predetermined size for writing less than the write threshold size, into the non-volatile semiconductor storage device,
upon receiving a write response in response to the issued first write request, update the third tracking data by adding the predetermined size for writing to the third cumulative size, and remove the first write command from the third queue when the third cumulative size equals the first write size, and
upon receiving a write response in response to the issued second write request, update the fourth tracking data by adding the predetermined size for writing to the fourth cumulative size, and remove the second write command from the fourth queue when the fourth cumulative size equals the second write size.

6. The data storage device of claim 5, wherein the first write request partially executes the first write command and one or more additional write requests are issued to fully execute the first write command.

7. The data storage device of claim 6, wherein the second write request fully executes the second write command.

8. The data storage device of claim 6, wherein the second write request partially executes the second write command and one or more additional write requests are issued to fully execute the second write command, the total number of write requests issued to fully execute the second write command being less than the total number of write requests issued to fully execute the first write command.

9. The data storage device of claim 5, wherein the predetermined size for reading is the same as the predetermined size for writing.

10. The data storage device of claim 5, wherein the predetermined size for reading is different from the predetermined size for writing.

11. In a data storage device having a non-volatile semiconductor storage device and a controller including a first interface and a second interface, a method of issuing read requests through the second interface to read data from the non-volatile semiconductor storage device in response to a sequence of read commands received from a host through the first interface, said method comprising:

separating the read commands received from the host into a first read command having a read size larger than the read threshold size and a second read command having a read size smaller than the read threshold size, and storing the first read command in a first queue and the second read command in a second queue;

issuing first and second read requests in succession through the second interface to read data of a predetermined size for reading less than the read threshold size, from the non-volatile semiconductor storage device;

upon receiving a read response in response to the issued first read request, updating first tracking data for the first read command, the first tracking data including a first read size, which is equal to the read size of the first read command, and a first cumulative size, and removing the first read command from the first queue when the first cumulative size plus the predetermined size for reading equals the first read size; and     upon receiving a read response in response to the issued second read request, updating second tracking data for the second read command, the second tracking data including a second read size, which is equal to the read size of the second read command, and a second cumulative size, and removing the second read command from the second queue when the second cumulative size plus the predetermined size for reading equals the second read size.

12. The method of claim 11, wherein the first read request partially executes the first read command and one or more additional read requests are issued to fully execute the first read command, and the second read request fully executes the second read command.

13. In a data storage device having a non-volatile semiconductor storage device and a controller including a first interface and a second interface, a method of issuing write requests through the second interface to write data into the non-volatile semiconductor storage device in response to a sequence of write commands received from a host through the first interface, said method comprising:

separating the write commands received from the host into a first write command having a write size larger than the write threshold size and a second write command having a write size smaller than the write threshold size, and storing the first write command in a first queue and the second write command in a second queue;

issuing first and second write requests in succession through the second interface to write data of a predetermined size for writing less than the write threshold size, into the non-volatile semiconductor storage device;

upon receiving a write response in response to the issued first write request, updating first tracking data for the first write command, the first tracking data including a first write size, which is equal to the write size of the first write command, and a first cumulative size, and removing the first write command from the first queue when the first cumulative size plus the predetermined size for writing equals the first write size; and     upon receiving a write response in response to the issued second write request, updating second tracking data for the second write command, the second tracking data including a second write size, which is equal to the write size of the second write command, and a second cumulative size, and removing the second write command from the second queue when the second cumulative size plus the predetermined size for writing equals the second write size.

14. The method of claim 13, wherein the first write request partially executes the first write command and one or more additional write requests are issued to fully execute the first write command, and the second write request fully executes the second write command.

* * * * *